UNITED STATES PATENT OFFICE.

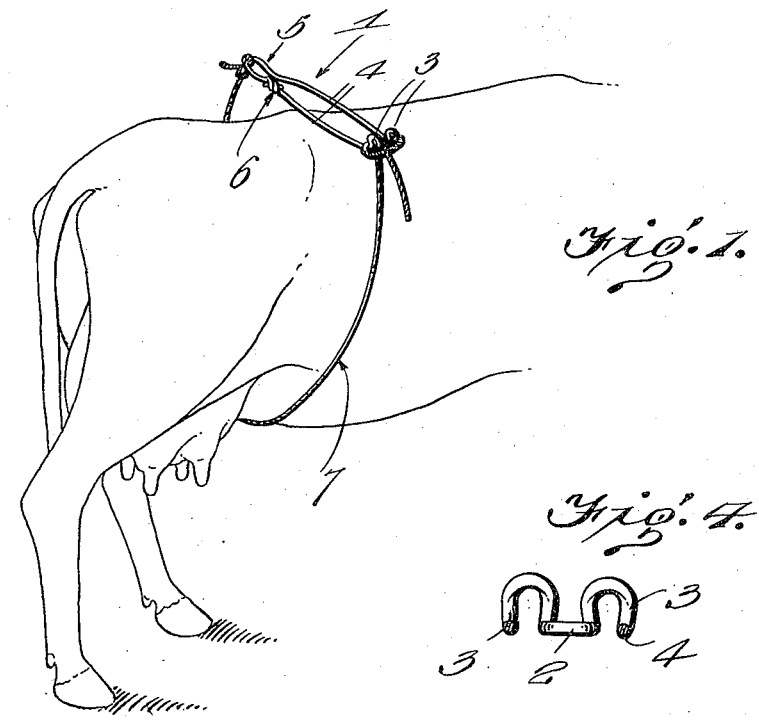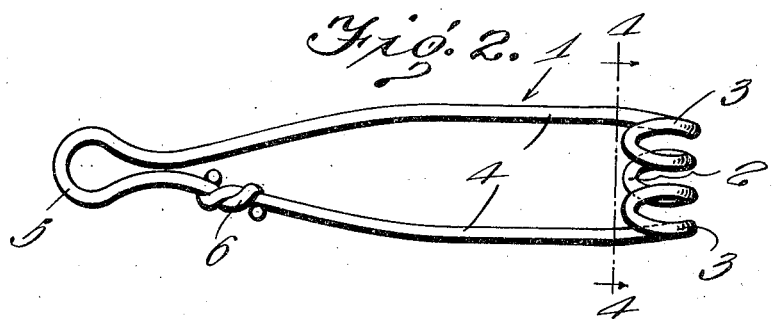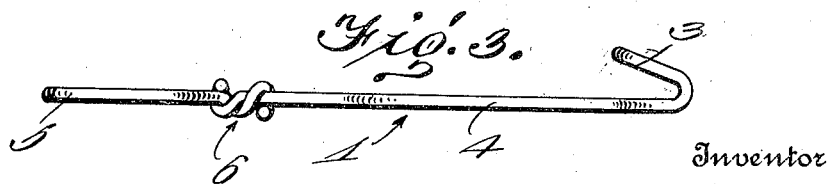

ALVAH BLACKBURN, OF ALUM BANK, PENNSYLVANIA.

ANTIKICKING DEVICE FOR COWS.

1,383,901.  Specification of Letters Patent.  Patented July 5, 1921.

Application filed February 14, 1921. Serial No. 444,909.

*To all whom it may concern:*

Be it known that I, ALVAH BLACKBURN, a citizen of the United States, residing at Alum Bank, in the county of Bedford and State of Pennsylvania, have invented certain new and useful Improvements in Antikicking Devices for Cows; and I do declare the following to be a full, clear, and exact description of the invention, such as will enable others skilled in the art to which it appertains to make and use the same.

This invention relates to anti-kicking devices for cows, that is, to a device which is especially designed to aid in milking the cow, it serving to prevent her from kicking the person carrying out the milking operation and also preventing her from urinating at the time the milking operation is in progress.

The principal object of the invention is to provide a simple device of this class including a rigid pain inflicting member which is designed to be placed cross-wise of the spinal bone of a cow, and a flexible inelastic retaining cord or element for the member which encircles the body of the animal and renders the pain inflicting member effective in case the cow attempts to kick or urinate. It is well known that when a cow attempts to kick or urinate, the spinal bone assumes a curved or bowed position and the stomach enlarges. This being the case, the body encircling cord will exert a downward pull on the opposite ends of the pain inflicting member and cause the latter to bear down on the spinal bone in such a way as to momentarily inflict pain on the animal. While the device may not be effective at the outset, it will, no doubt, effectively serve its purpose upon constant use.

Other objects and advantages of the invention will be apparent during the course of the following description.

In the accompanying drawings forming a part of this specification and in which like numerals are employed to designate like parts throughout the same:

Figure 1 is a perspective view of the device constructed in accordance with my invention showing the same in use on a cow.

Fig. 2 is an enlarged top plan view of the device.

Fig. 3 is a side or edge elevation of the same.

Fig. 4 is a transverse section taken on the plane of the line 4—4 of Fig. 2.

Referring to the drawings, wherein the preferred embodiment of the invention is clearly illustrated, the numeral 1 designates the pain inflicting member which, as before indicated, is designed to be placed cross-wise on the spinal bone of the cow in the manner illustrated in Fig. 1. It is only necessary that this member be rigid and it may be in the form of a bar or rod. However, by preference, I form it from a single length of wire which, in accordance with my ideas, is bent between its ends to form an open loop 2 and a pair of opposed hooks 3, intermediate arms 4, and an attaching eye 5, the ends of the wire being secured together as indicated at 6. The loop 2 as better seen in Fig. 4 is disposed in a plane with arms 4 and below the hooks 3, this particular construction serving to permit the free end of the body encircling rope or the flexible element 7 to be detachably connected thereto. The opposite end of this rope is permanently connected to the attaching eye 5.

The device is used as follows:

Assuming that one end of the body encircling cord 7 has been connected to the attaching eye 5, the member 1 is placed cross-wise of the animal's back and permitted to rest intermediate its end on the spinal bone. The rope is then drawn beneath the stomach of the animal and passed upwardly through the loop 2, twisted first to the right and then to the left about the hooks 3 and passed downwardly through the loop 2 as shown in Fig. 1. In this way, it will be securely attached to the member 1 and can be readily attached and detached from it. As before intimated, if the animal attempts to kick or urinate, the spinal bone will be bowed somewhat and the stomach will be expanded in such a way as to cause the opposite ends of the inelastic flexible element to exert a downward pull on the opposite ends of the pain inflicting member and render the latter effective. The pain will last only so long as the spinal bone is bowed or curved and the animal will soon be taught to refrain from kicking and urinating at the time she is being milked. In this way the attendant will not be annoyed by kicking nor will the milk be rendered unsanitary as is oftentimes the case.

From the foregoing description, it will be seen that I have devised a simple device for preventing the cow from kicking or urinating, the construction being such that effective results are insured from constant use of the device. It is simple in construction and easy to apply and is extremely inexpensive to both the manufacturer and the user.

The construction and the use of the device is thought to be obvious from the foregoing description and drawings. Therefore, a more lengthy and detailed description is unnecessary.

Since probably the best results may be obtained from the construction and arrangement herein shown and described, the construction and arrangement is taken as the preferred embodiment of the invention. However, I wish it to be understood that various minor changes in shape, size, and arrangement of parts may be resorted to without departing from the spirit of the invention or scope of the adjoining claims.

I claim:

1. An anti-kicking device for cows comprising a pain inflicting member for cross-wise disposition on the spinal bone of a cow, and a flexible inelastic retaining element for said member, being adapted to encircle the body of the animal.

2. An anti-kicking device for cows comprising a pain inflicting rod for cross-wise disposition on the spinal bone of the cow, a flexible inelastic retaining element having permanent connection with one end of the rod and quick detachable connection with the other end of the rod, said element being intended to encircle the body of the animal.

3. An anti-kicking device for cows comprising a pain inflicting member for cross-wise disposition on the spinal bone of the cow, being formed from a rod bent between its ends to form a pair of opposed hooks and a loop, the latter being disposed beneath and between the hooks, said rod being also bent to form a pair of spaced arms, and an attaching eye and having its ends connected together, and an inelastic body encircling retaining cord having one of its ends connected to said eye, its opposite end being adapted to be passed upwardly through the loop, wrapped around said hooks and then passed downwardly through the loop.

In testimony whereof I have hereunto set my hand.

ALVAH BLACKBURN.